US012602987B1

(12) United States Patent
Munawar

(10) Patent No.: US 12,602,987 B1
(45) Date of Patent: Apr. 14, 2026

(54) EMERGENCY ALERT GARMENT

(71) Applicant: Muneeb Munawar, Bowie, MD (US)

(72) Inventor: Muneeb Munawar, Bowie, MD (US)

( * ) Notice: Subject to any disclaimer, the term of this patent is extended or adjusted under 35 U.S.C. 154(b) by 19 days.

(21) Appl. No.: 18/969,578

(22) Filed: Dec. 5, 2024

(51) Int. Cl.

| | |
|---|---|
| ***G08B 25/01*** | (2006.01) |
| ***A41D 31/32*** | (2019.01) |
| ***A41F 9/00*** | (2006.01) |
| *G08B 3/10* | (2006.01) |
| *G08B 5/36* | (2006.01) |

(52) U.S. Cl.
CPC ........... *G08B 25/016* (2013.01); *A41D 31/32* (2019.02); *A41F 9/00* (2013.01); *G08B 25/012* (2013.01); *G08B 3/10* (2013.01); *G08B 5/36* (2013.01)

(58) Field of Classification Search
CPC ...... G08B 25/016; G08B 25/012; G08B 3/10; G08B 5/36; A41D 31/32; A41F 9/00
See application file for complete search history.

(56) References Cited

U.S. PATENT DOCUMENTS

| | | | | |
|---|---|---|---|---|
| 4,665,389 | A * | 5/1987 | Clendening | G08B 21/0202 340/693.9 |
| 5,254,970 | A * | 10/1993 | Brady | G08B 21/0297 340/534 |
| 5,471,199 | A * | 11/1995 | Yuan | G08B 15/004 340/693.5 |
| 10,257,434 | B2 | 4/2019 | Arnold | |
| 10,514,237 | B2 | 12/2019 | Piccioni | |
| 10,692,358 | B2 * | 6/2020 | King | G08B 15/004 |
| 10,814,894 | B2 | 10/2020 | Preston | |
| 12,488,668 | B2 * | 12/2025 | Burgess | G08B 5/38 |
| 2021/0287512 | A1 | 9/2021 | Kaindl | |
| 2021/0289174 | A1 | 9/2021 | Thiel | |

* cited by examiner

*Primary Examiner* — Nay Tun

(57) ABSTRACT

An emergency alert apparatus for providing stimuli such as alarms, lights, and data transmission to alert others to an emergency includes a garment which locks onto a user via a lock mechanism. An alert assembly is mounted to the garment and may include speakers, light emitters, data transmission electronics, and the like. An actuator is provided which triggers the alert assembly to exhibit stimuli intended to draw attention to the user. The alert assembly continues to exhibit the stimuli when the actuator is returned to an initial state and terminates the stimuli when the lock mechanism is unlocked.

16 Claims, 6 Drawing Sheets

EMERGENCY ALERT GARMENT

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to emergency alert apparatuses and more particularly pertains to a new emergency alert apparatus for providing stimuli such as alarms, lights, and data transmission to alert others to an emergency.

(2) Description of Related Art Including Information Disclosed Under 37 CFR 1.97 and 1.98

The prior art relates to emergency alert apparatuses and includes various devices which draw attention to a user when the user is experiencing an emergency such as through alarms, lights, data transmission, and the like. However, the prior art fails to describe such an apparatus that includes a garment that locks onto a user via a locking mechanism, includes an actuator to trigger an emergency alert response, and which deactivates the emergency alert response only when the lock mechanism is unlocked.

BRIEF SUMMARY OF THE INVENTION

An embodiment of the disclosure meets the needs presented above by generally comprising a garment configured to be worn by a user which comprises a belt sized and configured to be worn around a torso of the user. The belt comprises a strap and a connector. The connector has a pair of mating members, each of which is coupled to an associated end of a pair of ends of the strap. The mating members are releasably couplable together such that the belt forms a closed loop. A lock mechanism is coupled to the belt of the garment and is operable to secure the pair of mating members of the connector of the belt to each other. A processor is mounted to the garment, and an alert assembly operably coupled to the processor. The alert assembly is configured to emit stimuli when activated. An emergency actuator is operatively coupled to the processor and is movable between an activating state and a deactivated state. The processor is programmed to activate the alert assembly in an emergency response which consists of particular stimuli being exhibited by the alert assembly when the emergency actuator is moved to the activating state. The processor is also programmed to continue the emergency response when the emergency actuator is moved from the activating state to the deactivated state. The processor is operably coupled to the lock mechanism and is programmed to terminate the emergency response when the lock mechanism is unlocked.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
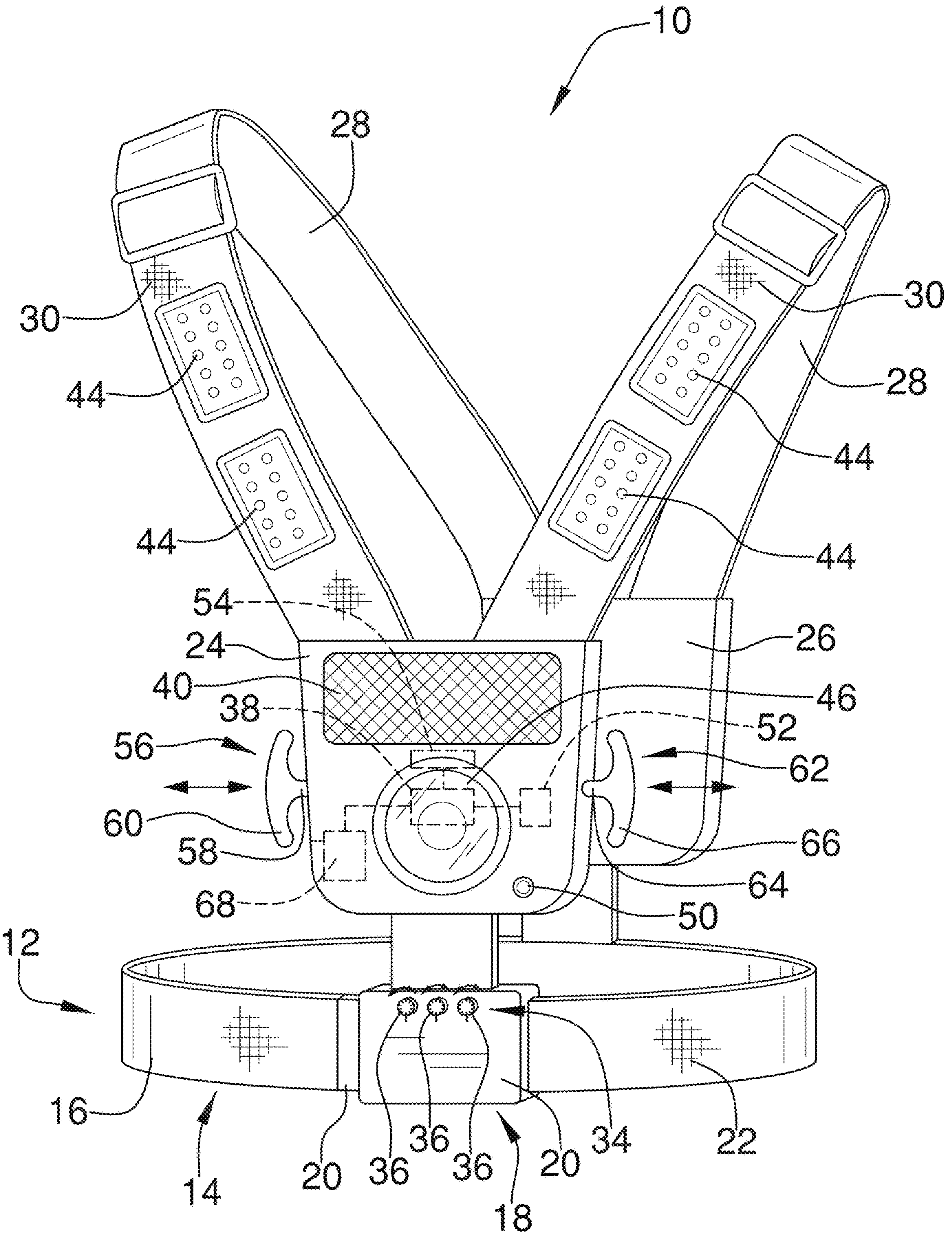
FIG. 1 is a front perspective view of an emergency alert apparatus according to an embodiment of the disclosure.
Figure 2:
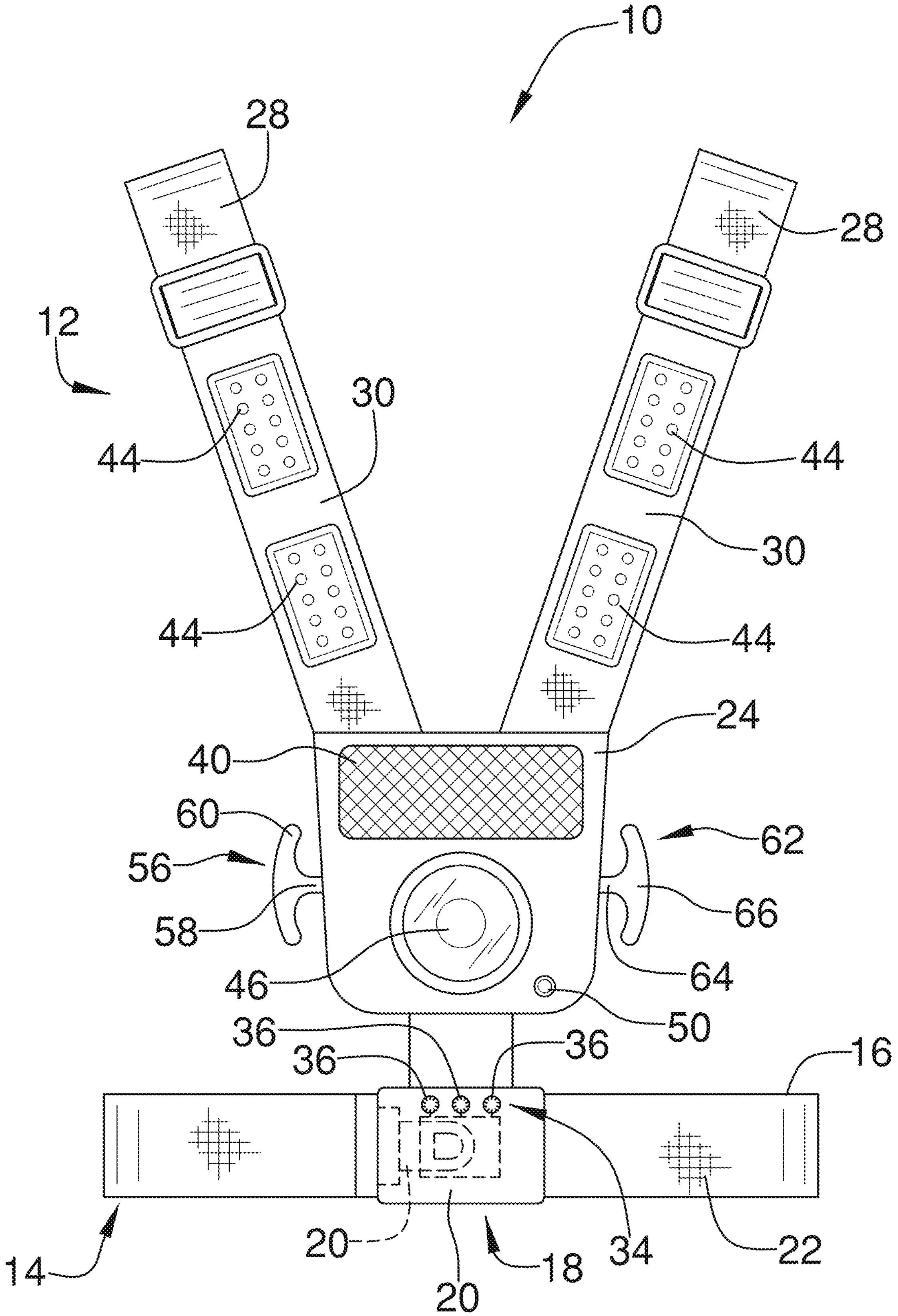
FIG. 2 is a front view of an embodiment of the disclosure.
Figure 3:
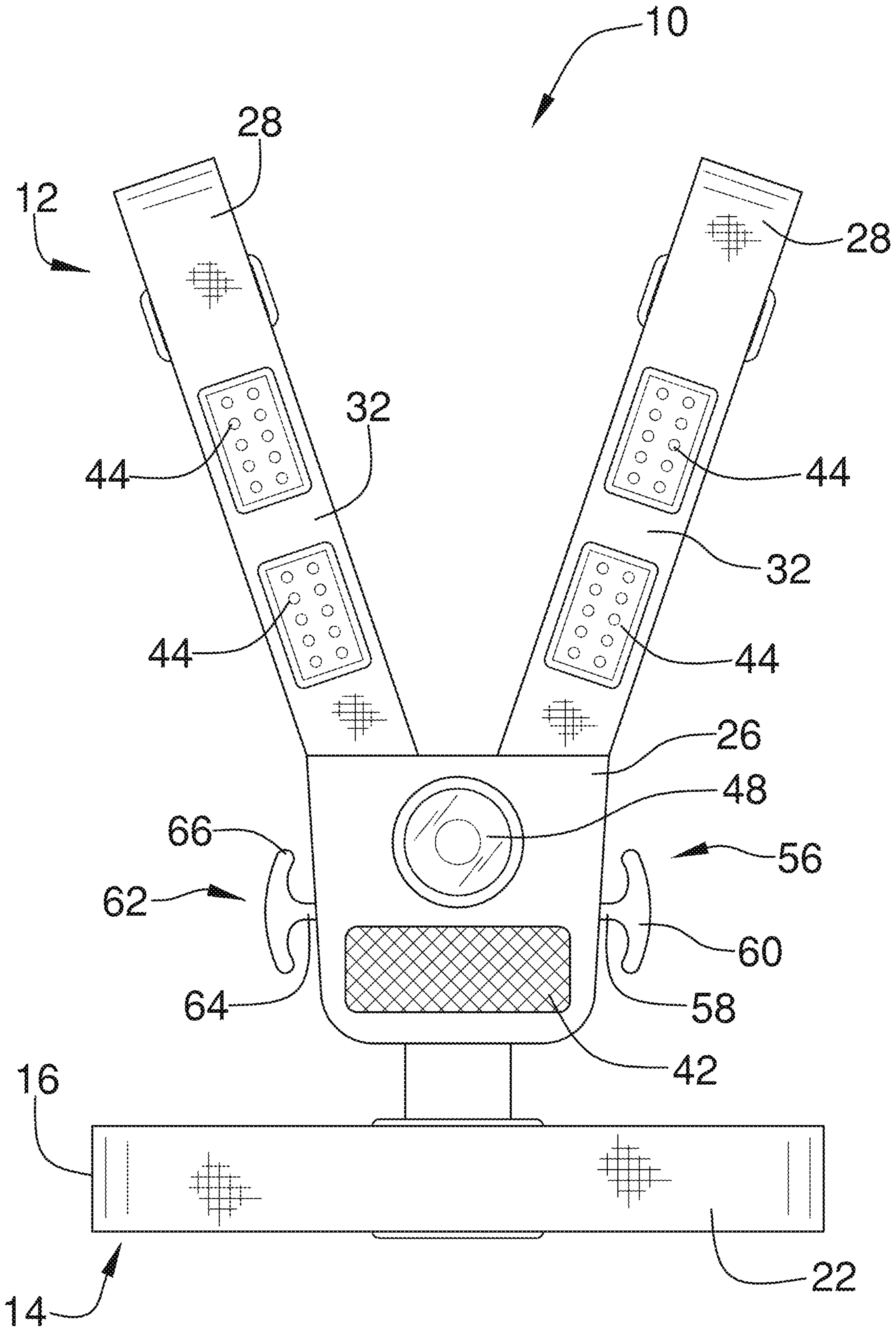
FIG. 3 is a rear view of an embodiment of the disclosure.
Figure 4:
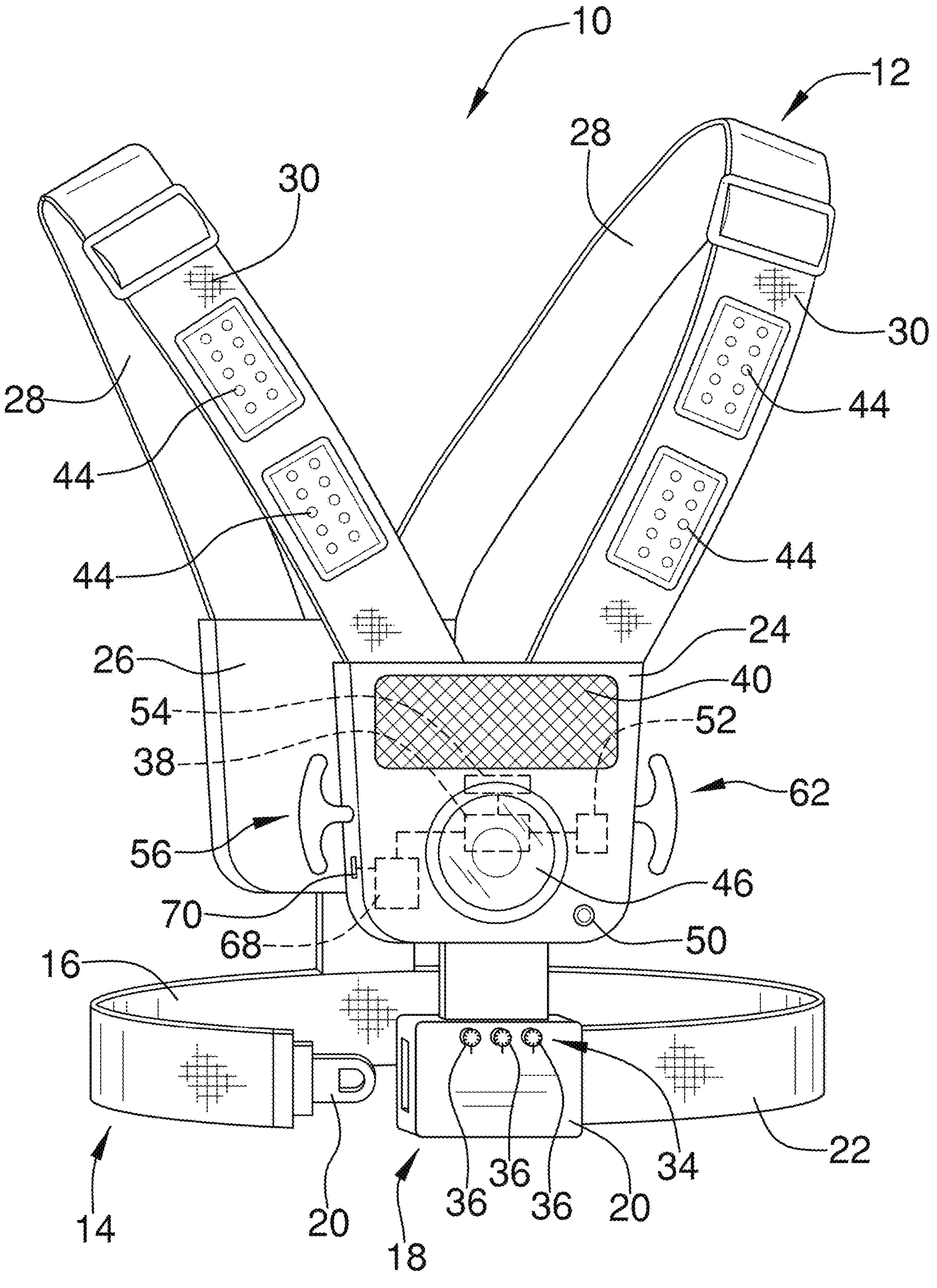
FIG. 4 is another front perspective view of an embodiment of the disclosure.
Figure 5:
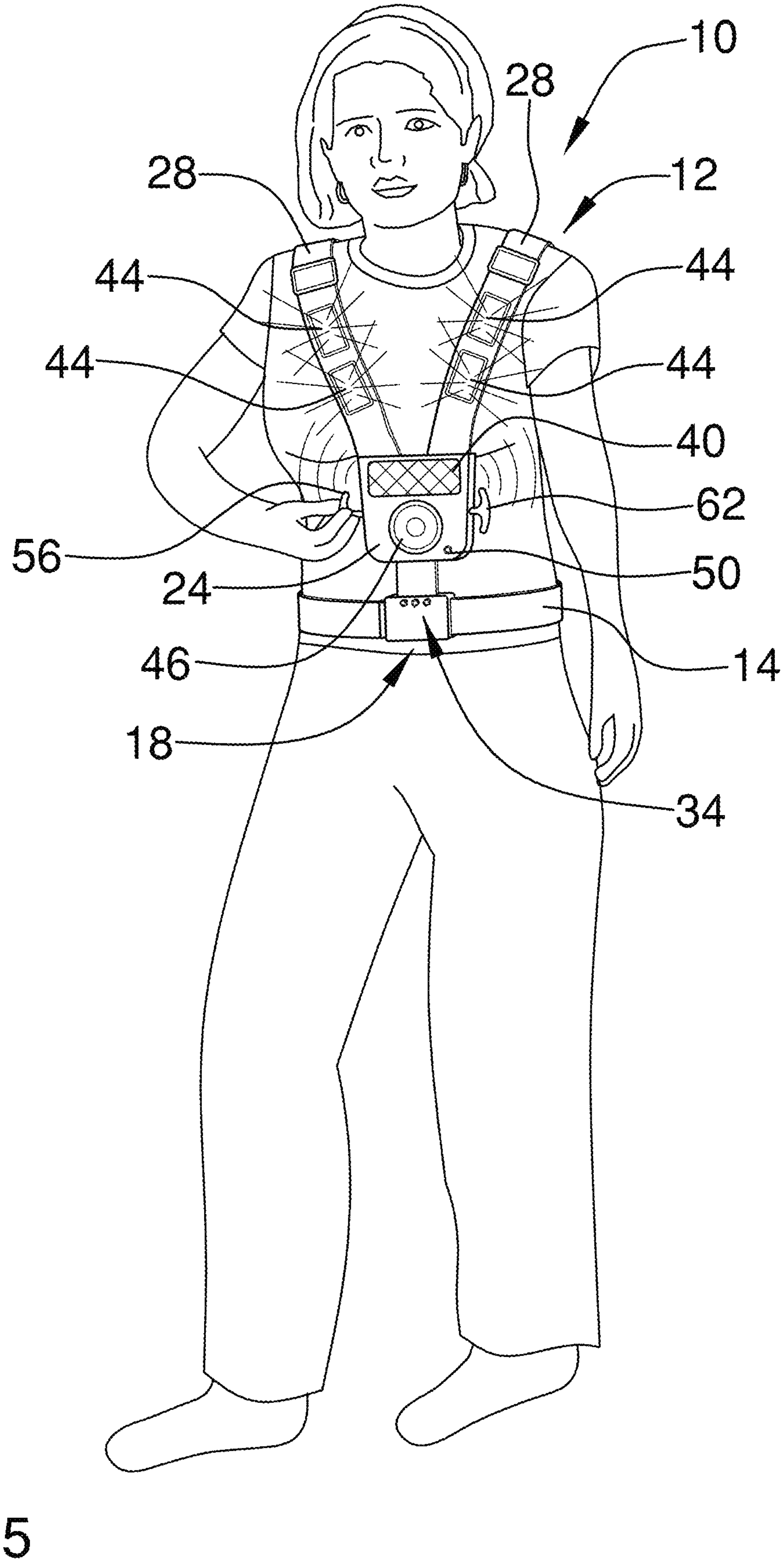
FIG. 5 is an in-use view of an embodiment of the disclosure.
Figure 6:
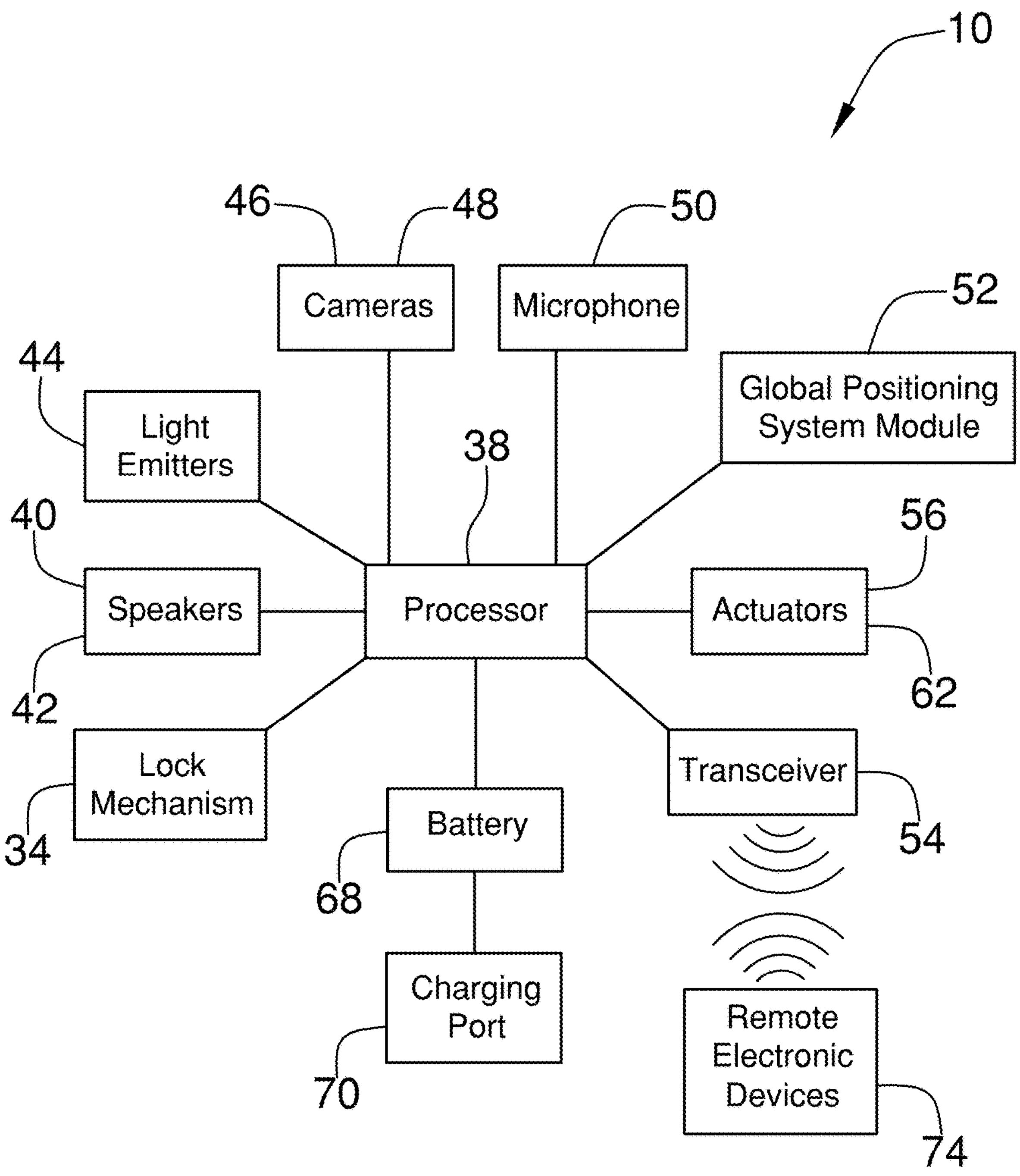
FIG. 6 is a block diagram of an embodiment of the disclosure.

With reference now to the drawings, and in particular to FIGS. 1 through 6 thereof, a new emergency alert apparatus embodying the principles and concepts of an embodiment of the disclosure and generally designated by the reference numeral 10 will be described.

As best illustrated in FIGS. 1 through 6, the emergency alert apparatus 10 generally comprises a garment 12 configured to be worn by a user 72. The garment 12 comprises a belt 14 which is sized to be worn around a torso of the user 72, a front housing 24 and a rear housing 26 coupled to the belt 14, and a pair of shoulder straps 28 coupled to and extending between the front housing 24 and the rear housing 26. The front housing 24 and the rear housing 26 are positioned opposite each other across the belt 14 when the belt 14 forms a closed loop. The belt 14 comprises a strap 16 and a connector 18, wherein each one of a pair of mating members 20 of the connector 18 is mounted to a respective end of a pair of ends of the strap 16. The mating members 20 releasably couple together to secure the belt 14 in the closed loop. The strap 16 comprises a cut-resistant material to prevent another from forcibly removing the garment 12 from the user 72. The cut-resistant material may include metal wires, metal chains, aramid materials, or the like. An outer surface 22 of the strap 16 comprises a reflective material which reflects ambient light so as to be more visible to passersby. The reflective material may be a metal, a reflective plastic, or the like.

The garment 12 may take any number of forms that facilitate being worn by the user 72. For example, in some embodiments, the garment 12 may comprise only the belt 14. In other embodiments, the garment 12 may include additional harness straps or may include fabric to form a vest, a shirt, a pair of pants, or the like.

A lock mechanism 34 is coupled to the belt 14 of the garment 12 and is operable to secure the pair of mating members 20 of the connector 18 of the belt 14 to each other. The lock mechanism 34 comprises a combination lock which includes multiple dials 36 that may be turned to keyed positions that allow the mating members 20 to separate from each other. Indicia such as numbers, letters, graphical images, or the like may be included on the dials 36 to indicate when the dials 36 are or are not positioned to allow the mating members 20 to separate. Any of a variety of locks may be used in other embodiments, such as keyed tumbler locks, electronic locks (such as those that require biometric data to unlock), or the like.

A processor 38 is mounted in the front housing 24 of the garment 12. An alert assembly operably coupled to the processor 38. The alert assembly may be activated by the processor 38 to provide an emergency response or a warning response. As detailed more below, the emergency response taken by the processor 38 may comprise emitting various stimuli to draw attention to the user 72 which may cause attackers or would-be attackers to flee out of fear of having illicit actions witnessed by others. The emergency response may also comprise transmitting data such as video data, audio data, and location data to remotely placed devices. The warning response may also comprise the processor 38 activating the alert assembly to provide various stimuli which may exhibit less intensity than the stimuli emitted during the emergency response. The number of modes of stimuli emitted during the warning response also may be less than the number of modes of stimuli emitted during the emergency response. The quantity or type of data transmitted during the warning response, if any, may vary relative to the quantity or type of data transmitted during the emergency response, and the sources to which data is transmitted may vary between the warning response and the emergency response.

The alert assembly comprises a front speaker 40 and a rear speaker 42, a plurality of light emitters 44, a front camera 46 and a rear camera 48, a microphone 50, a global positioning system module 52, and a transceiver 54. The front speaker 40 is positioned on the front housing 24 of the garment 12, and the rear speaker 42 is mounted to the rear housing 26 of the garment 12. Each light emitter 44 of the plurality of light emitters 44 is positioned on an associated shoulder strap 28 of the pair of shoulder straps 28. Each light emitter 44 of the plurality of light emitters 44 is positioned on an associated one of a front side 30 of the associated shoulder strap 28 and a back side 32 of the associated shoulder strap 28. The front camera 46 is positioned on the front housing 24 of the garment 12, and the rear camera 48 is positioned on the rear housing 26 of the garment 12. The microphone 50 is positioned on the front housing 24 of the garment 12. The global positioning system module 52 is mounted to the garment 12. The transceiver 54 is positioned in the front housing 24 and is configured to wirelessly communicate with a plurality of remote electronic devices 74 via the transceiver 54. In other embodiments, the various components of the alert assembly may be rearranged on the garment 12.

An emergency actuator 56 and a warning actuator 62 are operatively coupled to the processor 38 and may be operated to command the processor 38 to engage in the emergency response and the warning response respectively. The emergency actuator 56 and the warning actuator 62 each comprise an extension member 56, 64 and a grip portion 58, 66. The extension member 56, 64 is coupled to the front housing 24 and is movable alternately into and away from the front housing 24. The grip portion 58, 66 is coupled to the extension member 56, 64 opposite the front housing 24. The extension member 56, 64 is positioned centrally between a pair of ends of the grip portion 58, 66. The grip portion 58, 66 has an arcuate shape with a concave side facing the front housing 24. Each of the emergency actuator 56 and the warning actuator 62 may be pulled away from the front housing 24 to trigger the emergency response and the warning response respectively. Each of the emergency actuator 56 and the warning actuator 62 may toggle between two positions or may completely separate from the front housing 24 when pulled away from the front housing 24.

The emergency actuator 56 is movable between an activating state and a deactivated state, wherein the activating state is an extended position with respect to the first housing and the deactivated state is a retracted position with respect to the first housing. The emergency actuator 56 may be entirely separated from the front housing 24 when in the extended position. The processor 38 is programmed to cause the alert assembly to exhibit the emergency response when the emergency actuator 56 is moved to the activating state. The processor 38 is programmed to continue causing the alert assembly to exhibit the emergency response, even if the emergency actuator 56 is returned to the deactivated state from the activating state. The lock mechanism 34 is in communication with the processor 38, and the processor 38 is programmed to terminate the emergency response only if the lock mechanism 34 is unlocked.

The warning actuator 62 is movable between an activation state and a deactivation state, wherein the activation state is an extended position with respect to the first housing and the deactivation state is a retracted position with respect to the first housing. The warning actuator 62 may be entirely separated from the front housing 24 when in the extended position. The processor 38 is programmed to cause the alert assembly to exhibit the warning response when the warning actuator 62 is moved to the activation state. The processor 38 is also programmed to terminate causing the alert assembly to exhibit the warning response when the warning actuator 62 is returned to the deactivation state from the activation state. In other embodiments, the emergency actuator 56 and the warning actuator 62 may take different forms. For example, the emergency actuator 56 and the warning actuator 62 may be pivot switches, buttons, dials 36, biometric readers, or the like.

The emergency actuator 56 and the warning actuator 62 are positioned opposite each other across the front housing 24, which aids in identifying which actuator 56, 62 will perform which function. Additional indicia may be included to further differentiate the emergency actuator 56 and the warning actuator 62. For example, the emergency actuator 56 may be colored red while the warning actuator 62 may be colored yellow. The additional indicia may also include labels on or near the actuators 56, 62 which include words, graphical images, symbols, or the like.

The emergency response includes the processor 38 activating the front speaker 40 and the rear speaker 42 to emit an audible alarm, the processor 38 activating the plurality of light emitters 44 to emit a light, the processor 38 activating the front camera 46 and the rear camera 48 to record a front video file and a rear video file, the processor 38 activating the microphone 50 to record an audio file, and the processor 38 activating the global positioning system module 52 to generate location data corresponding to the garment 12. The emergency response further includes the processor 38 storing the front video file, the rear video file, the audio file, and the location data on a memory of the processor 38 and transmitting the front video file, the rear video file, the audio file, and the location data to a plurality of remote electronic devices 74 via the transceiver 54. The remote electronic devices 74 may be computers, smartphones, tablets, or other such interfaces. The remote electronic devices 74 may, for example, belong to family or friends of the user 72 or emergency services.

The warning response includes the processor 38 activating the plurality of light emitters 44 to emit a light, the processor 38 activating the front camera 46 and the rear camera 48 to record a front video file and a rear video file, and the processor 38 activating the microphone 50 to record an audio file. The warning response further includes the processor 38 storing the front video file, the rear video file, and the audio file on a memory of the processor 38 and transmitting the front video file, the rear video file, and the audio file to a subset of the plurality of remote electronic devices 74 via the transceiver 54. For example, the subset of the plurality of remote electronic devices 74 may include only those devices belonging to family and friends and exclude emergency services.

A power supply 68 comprising a battery is electrically coupled to the processor 38. The power supply 68 is mounted in the front housing 24. In other embodiments, the power supply 68 may comprise a capacitor or other suitable energy storage. A charging port 70 is electrically coupled to the power supply 68 and is mounted on the front housing 24.

In use, the garment 12 may be worn by the user 72 in situations where the user 72 may expect that a dangerous or emergent event may befall them. For example, if the user 72 is under attack or under threat of attack by another, the user 72 may pull either the emergency actuator 56 to activate the emergency response of the alert assembly or the warning actuator 62 to activate the warning response of the alert assembly. The connector 18 of the belt 14 of the garment 12 may be coupled together and locked via the locking mechanism to prevent forceful removal of the garment 12 from another. As described above, returning the warning actuator 62 to the deactivation state/retracted position of the warning actuator 62 causes the processor 38 to terminate the warning response of the alert assembly. Meanwhile, returning the emergency actuator 56 to the deactivated state/retracted position of the emergency actuator 56 does not cause the processor 38 to terminate the emergency response of the alert assembly. Unlocking the locking mechanism will trigger the processor 38 to terminate the emergency response of the alert assembly.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An emergency alert apparatus comprising:

a garment configured to be worn by a user, the garment comprising:

a belt sized and configured to be worn around a torso of the user, the belt comprising a strap and a connector, the connector having a pair of mating members, each mating member of the pair of mating members of the connector being coupled to an associated end of a pair of ends of the strap, the pair of mating members being releasably couplable together such that the belt forms a closed loop;

a lock mechanism coupled to the belt of the garment, the lock mechanism being operable to secure the pair of mating members of the connector of the belt to each other;

a processor mounted to the garment; an alert assembly operably coupled to the processor, the alert assembly being configured to emit stimuli when activated;

an emergency actuator operatively coupled to the processor, the emergency actuator being movable between an activating state and a deactivated state, the processor being programmed to activate the alert assembly in an emergency response when the emergency actuator is moved to the activating state, the processor being programmed to continue the emergency response when the emergency actuator is moved from the activating state to the deactivated state;

wherein the processor is operably coupled to the lock mechanism, the processor being programmed to terminate the emergency response when the lock mechanism is unlocked; and a warning actuator operatively coupled to the processor, the processor being programmed to selectively activate the alert assembly in a warning response, the warning actuator being movable between an activation state and a deactivation state, the processor being programmed to terminate the warning response when the warning actuator is moved from the activation state to the deactivation state;

wherein: the garment further comprises a first housing coupled to the belt; and the warning actuator comprises a warning actuator, the warning actuator being positioned in an extended position with respect to the first housing when in the activation state, the warning actuator being positioned in a retracted position with respect to the first housing when in the deactivation state.

2. The emergency alert apparatus of claim 1, wherein the strap of the belt of the garment comprises a cut-resistant material.

3. The emergency alert apparatus of claim 1, wherein an outer surface of the strap of the belt of the garment comprises a reflective material.

4. The emergency alert apparatus of claim 1, wherein the lock mechanism comprises a combination lock.

5. The emergency alert apparatus of claim 1, wherein the alert assembly comprises a speaker mounted to the garment, the emergency response of the alert assembly including the processor activating the speaker to emit an audible alarm.

6. The emergency alert apparatus of claim 1, wherein the alert assembly comprises a light emitter mounted to the garment, the emergency response of the alert assembly including the processor activating the light emitter to emit a light.

7. The emergency alert apparatus of claim 1, wherein:
the alert assembly comprises a camera and a microphone; and
the emergency response of the alert assembly includes:
the processor activating the camera to record a video file;
the processor activating the microphone to record an audio file; and
the processor storing the video file and the audio file on a memory of the processor.

8. The emergency alert apparatus of claim 7, wherein:
the alert assembly further comprises a transceiver, the processor being configured to wirelessly communicate with a plurality of remote electronic devices via the transceiver; and
the emergency response of the alert assembly further includes the processor transmitting the video file and the audio file to the plurality of remote electronic devices via the transceiver.

9. The emergency alert apparatus of claim 1, wherein:
the alert assembly comprises a global positioning system module; and
the emergency response of the alert assembly includes:
the processor activating the global positioning system module to generate location data corresponding to the garment; and
the processor storing the location data on a memory of the processor.

10. The emergency alert apparatus of claim 9, wherein:
the alert assembly comprises a transceiver, the processor being configured to wirelessly communicate with a plurality of remote electronic devices via the transceiver; and
the emergency response of the alert assembly further includes the processor transmitting the location data to the plurality of remote electronic devices.

11. The emergency alert apparatus of claim 1, wherein: the emergency actuator comprises an emergency actuator, the emergency actuator being positioned in an extended position with respect to the first housing when in the activating state, the emergency actuator being positioned in a retracted position with respect to the first housing when in the deactivated state.

12. The emergency alert apparatus of claim 1, wherein the alert assembly comprises a light emitter mounted to the garment, the warning response of the alert assembly including the processor activating the light emitter to emit a light.

13. The emergency alert apparatus of claim 1, wherein:
the alert assembly comprises a camera and a microphone; and
the warning response of the alert assembly includes:
the processor activating the camera to record a video file;
the processor activating the microphone to record an audio file; and
the processor storing the video file and the audio file on a memory of the processor.

14. The emergency alert apparatus of claim 1, wherein:
the alert assembly further comprises a transceiver, the processor being configured to wirelessly communicate with a plurality of remote electronic devices via the transceiver; and
the warning response of the alert assembly further includes the processor transmitting the video file and the audio file to the plurality of remote electronic devices via the transceiver.

15. The emergency alert apparatus of claim 1, wherein:
the alert assembly comprises a global positioning system module; and
the emergency response of the alert assembly includes:
the processor activating the global positioning system module to generate location data corresponding to the garment; and
the processor storing the location data on a memory of the processor.

16. An emergency alert apparatus comprising:
a garment configured to be worn by a user, the garment comprising:
a belt sized and configured to be worn around a torso of the user, the belt comprising a strap and a connector, the connector having a pair of mating members, each mating member of the pair of mating members of the connector being coupled to an associated end of a pair of ends of the strap, the pair of mating members being releasably couplable together such that the belt forms a closed loop, the strap comprising a cut-resistant material, an outer surface of the strap comprising a reflective material;
a front housing and a rear housing coupled to the belt, the front housing and the rear housing being positioned opposite each other when the belt forms the closed loop; and
a pair of shoulder straps coupled to and extending between the front housing and the rear housing;
a lock mechanism coupled to the belt of the garment, the lock mechanism being operable to secure the pair of mating members of the connector of the belt to each other, the lock mechanism comprising a combination lock;
a processor mounted in the front housing of the garment;
an alert assembly operably coupled to the processor, the alert assembly comprising:
a front speaker and a rear speaker mounted to the garment, the front speaker being positioned on the front housing of the garment, the rear speaker being mounted to the rear housing of the garment;
a plurality of light emitters coupled to the garment, each light emitter of the plurality of light emitters being positioned on an associated shoulder strap of the pair of shoulder straps, each light emitter of the plurality of light emitters being positioned on an associated one of a front side of the associated shoulder strap and a back side of the associated shoulder strap;
a front camera and a rear camera mounted to the garment, the front camera being positioned on the front housing of the garment, the rear camera being positioned on the rear housing of the garment;
a microphone mounted to the garment, the microphone being positioned on the front housing of the garment;

a global positioning system module mounted to the garment; and a transceiver mounted to the garment, the transceiver being positioned in the front housing, the processor being configured to wirelessly communicate with a plurality of remote electronic devices via the transceiver;

an emergency actuator operatively coupled to the processor, the emergency actuator being mounted to the front housing of the garment, the processor being programmed to selectively activate the alert assembly in an emergency response, the emergency actuator being movable between an activating state and a deactivated state, the processor being programmed to continue the emergency response when the emergency actuator is moved from the activating state to the deactivated state, the emergency actuator comprising an emergency actuator, the emergency actuator being positioned in an extended position with respect to the front housing when in the activating state, the emergency actuator being positioned in a retracted position with respect to the front housing when in the deactivated state, the emergency response including:

the processor activating the front speaker and the rear speaker to emit an audible alarm;

the processor activating the plurality of light emitters to emit a light;

the processor activating the front camera and the rear camera to record a front video file and a rear video file;

the processor activating the microphone to record an audio file;

the processor activating the global positioning system module to generate location data corresponding to the garment;

the processor storing the front video file, the rear video file, the audio file, and the location data on a memory of the processor; and the processor transmitting the front video file, the rear video file, the audio file, and the location data to the plurality of remote electronic devices via the transceiver;

wherein the processor is operably coupled to the lock mechanism, the processor being programmed to terminate the emergency response when the lock mechanism is unlocked; and a warning actuator operatively coupled to the processor, the warning actuator being mounted to the front housing of the garment opposite the emergency actuator, the processor being programmed to selectively activate the alert assembly in a warning response, the warning actuator being movable between an activation state and a deactivation state, the processor being programmed to terminate the warning response when the warning actuator is moved from the activation state to the deactivation state, the warning actuator comprising a warning actuator, the warning actuator being positioned in an extended position with respect to the front housing when in the activation state, the warning actuator being positioned in a retracted position with respect to the front housing when in the deactivation state, the warning response including:

the processor activating the plurality of light emitters to emit a light;

the processor activating the front camera and the rear camera to record a front video file and a rear video file;

the processor activating the microphone to record an audio file;

the processor storing the front video file, the rear video file, and the audio file on a memory of the processor; and the processor transmitting the front video file, the rear video file, and the audio file to a subset of the plurality of remote electronic devices via the transceiver;

wherein the emergency actuator and the warning actuator each comprises:

an extension member coupled to the front housing, the extension member being movable alternately into and away from the front housing; and a grip portion coupled to the extension member opposite the front housing, the extension member being positioned centrally between a pair of ends of the grip portion, the grip portion having an arcuate shape with a concave side facing the front housing;

a power supply electrically coupled to the processor, the power supply comprising a battery, the power supply being mounted in the front housing; and a charging port electrically coupled to the power supply and mounted on the front housing.

* * * * *